Dec. 2, 1969     E. D. LYTLE     3,482,131
POLYPHASE ALTERNATOR WINDING ARRANGEMENT
Filed Sept. 27, 1966     3 Sheets-Sheet 1

ELVIN D. LYTLE
INVENTOR.

BY
ATTORNEY

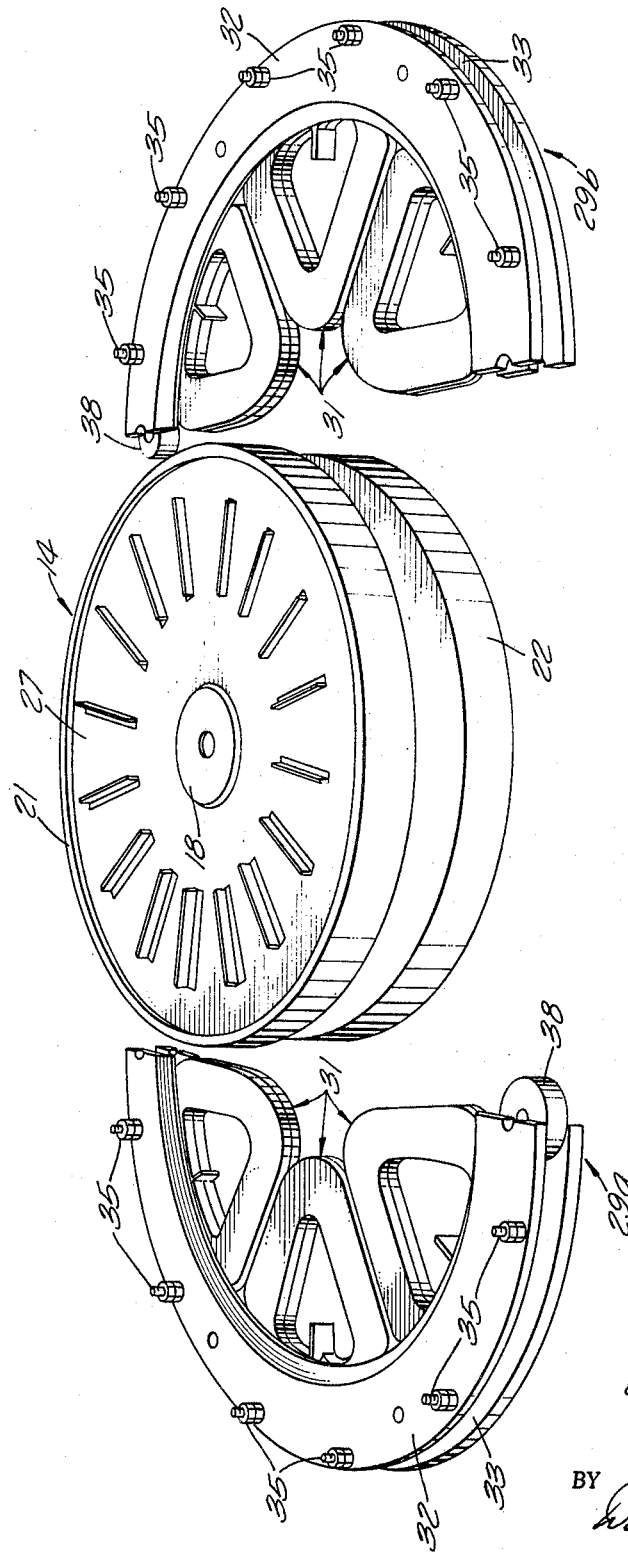

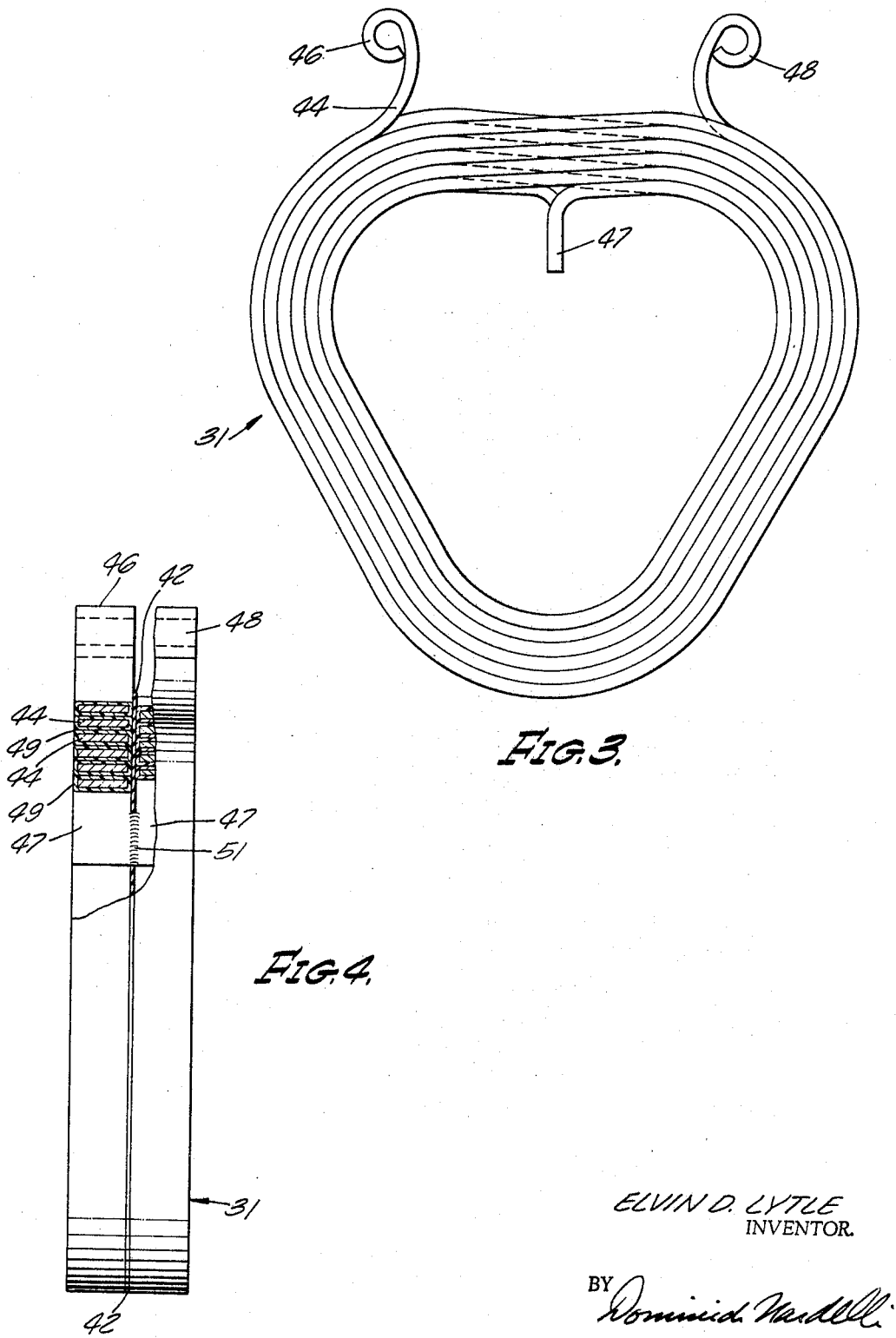

United States Patent Office 3,482,131
Patented Dec. 2, 1969

3,482,131
POLYPHASE ALTERNATOR WINDING
ARRANGEMENT
Elvin D. Lytle, Torrance, Calif., assignor to The Garrett Corporation, Los Angeles, Calif., a corporation of California
Filed Sept. 27, 1966, Ser. No. 582,336
Int. Cl. H02k 21/12, 1/12, 1/22
U.S. Cl. 310—156                                    1 Claim

ABSTRACT OF THE DISCLOSURE

A three-phase alternator has a rotating magnet assembly with an axially aligned air gap, and a stationary stator assembly disposed in the air gap. The magnet assembly has two pairs of opposing magnetic poles so that the lines of flux are aligned axially and the stator assembly is formed of two symmetrical parts with each part having three coils laid side by side in a semicircle to allow for insertion of the stator after the magnet assembly is assembled.

---

This invention relates in general to an electric alternator and more particularly to a polyphase alternating current generator having a fixed stator disposed between opposing rotating magnetic field structures.

An object of this invention is to provide a three-phase stator winding arrangement, that can be separated into two or more sections, to permit assembly between two or more permanently assembled magnetic field structures.

A desirable feature in alternators with permanent magnetic field poles is that the magnetic field structures be permanently assembled since a portion of the magnetic field strength would be lost if the opposing magnetic poles are separated.

Another object of this invention is to provide a three-phase stator winding with a maximum of two rows of conductors, in order to permit an efficient transfer of heat from the inside of the coil to the surface without passing through insulating materials.

The conventional polyphase stator winding arrangement consists of a number of coils equal to the product of the number of poles and the number of phases, and laminated in as many layers as there are phases. Since each coil must contain at least two rows of conductors to obtain minimum thickness and freedom from crossovers, at least six rows of conductors are needed in a three-phase winding. Obviously, the stator conductors in the center layer would be more difficult to cool, than those near the surface.

This invention uses a number of stator coils equal to one half the product of the number of poles, and the number of phases. Thus, in a three-phase alternator, the stator coils are made to extend over approximately two-thirds of a pole pitch. Now, when the required number of coils is assembled, they lie in a single layer without any overlap. Groups that include one or more coils are cemented together to form two or more circular segments, which may be assembled to form a complete circular stator structure. The stator coils are made of two congruent spiral coil sections with the inner ends bonded together so that the outer ends are conveniently connected to terminal studs, thereby simplifying the interconnections of the various coils after assembly.

These and other objects and features of the present invention will become more apparent from a review of the specification and claims, when taken in conjunction with the drawings, wherein:

FIG. 2 is a pictorial view of the magnetic field structure and stator assembly disassembled from the alternator showing the relative relationship between the parts;

FIG. 3 is a diagrammatic plan view of one of the coils in the stator; and

FIG. 4 is a diagrammatic cross-sectional view of one of the coils in the stator.

Figure 1:
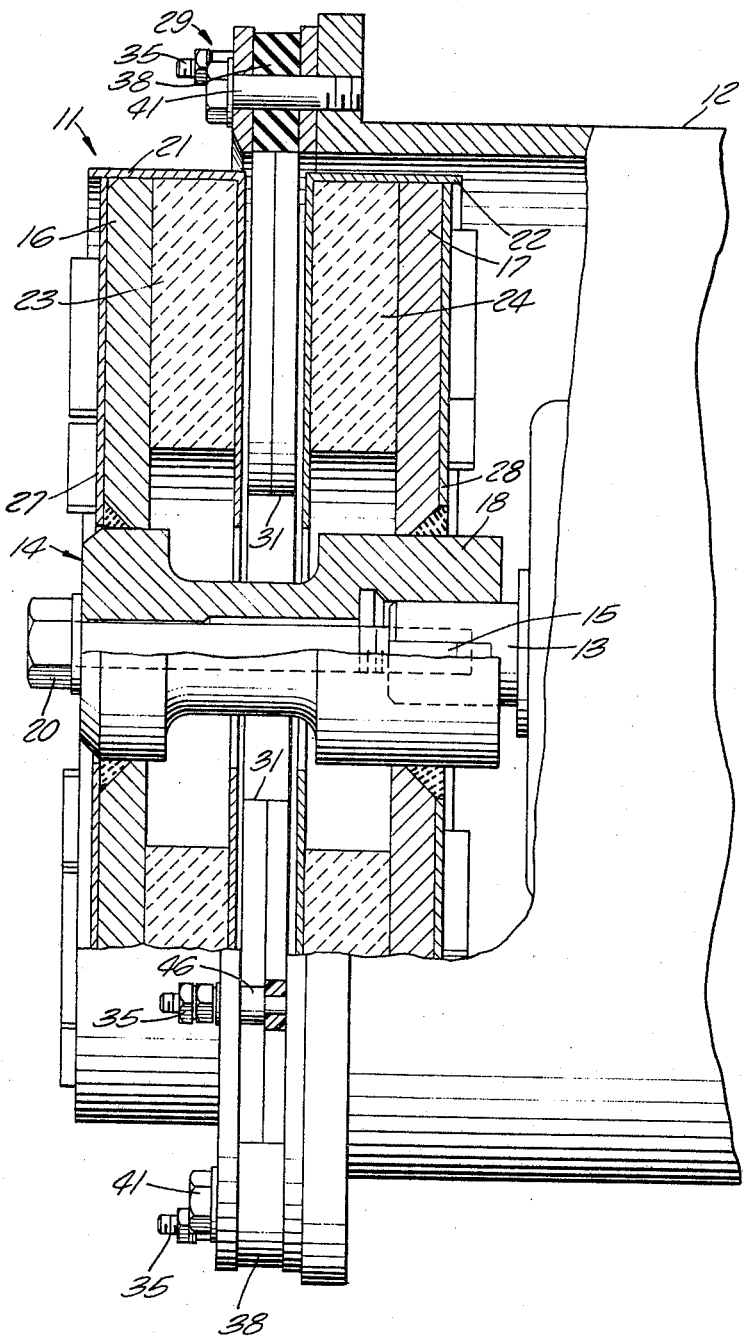
FIG. 1 is an elevation of an alternator shown in partial section and incorporating the invention.

Referring to the drawings and to FIG. 1, in particular, there is shown an alternator 11 powered by a suitable prime mover 12. The prime mover has a rotating shaft 13 on which is mounted a magnetic field structure 14. The magnetic field structure 14 has a hub 18 that is suitably keyed and bolted by key 15 and bolt 20 to shaft 13 to rotate therewith. The magnetic field structure or rotor assembly 14 consists of non-magnetic metallic cups 21 and 22 into which are assembled permanent magnets 23 and 24, iron discs 16 and 17, and suitable cooling fans 27 and 28. The discs 16 and 17 are welded to hub 18. The cups 21 and 22, magnets 23 and 24, and fans 27 and 28 are suitably fixed to the iron discs 16 and 17, respectively. In this embodiment, portions of each one of the magnets 23 and 24 are magnetized so as to produce four poles wherein the North and South poles alternate on a respective magnet. The North poles of one magnet are disposed directly opposite the South poles of the other magnet. Thus, the useful magnetic flux is aligned axially parallel to the axis of rotation and provides an axially extending magnetic field between the magnetized portions of magnets 23 and 24. Between the two magnets 23 and 24 is disposed a stator 29.

Although the drawings do not show the number of poles on each magnet, the following description assumes that each magnet has four poles, two North and two South. However, the magnets may have more or less poles, then the number of coils in the stator would vary accordingly as long as the total number of coils for a three-phase alternator is one half of the product of the poles and phases.

Referring to FIG. 2, the stator 29 is shown in two stator sections 29a and 29b, and removed from the rotor assembly 14. Since this is a three-phase alternator with 4 pairs of opposing poles, each one of the stator sections 29a and 29b has three stator coils 31 assembled between sectors 32 and 33, along with a spacer 38 disposed as shown. The coil leads are connected to terminal studs 35. Thus, when stator sections 29a and 29b are assembled into alternator 11, the exposed portion of spacers 38 interlock between sectors 32 and 33 in the opposite stator section. The stator 29 is bolted to the prime mover in stationary relationship with bolts 41, as shown in FIG. 1.

Referring to FIGS. 3 and 4, each coil 31 is wound of flat wire 44. Each coil 31 includes two identical coil sections disposed coaxially, but with one coil section oriented 180° with respect to each other. The inner coil ends 47 of two coil sections are welded by joint 51 to form a continuous electrical path between outer coil ends 46 and 48, therefore any current therein flows in the same direction through both coil sections. A thin sheet of electrical insulation 42 is interposed between the two coil sections, which insulation does not interrupt the flow of heat from the conductor 44 to the coil surfaces. The conductors 44 in each coil section are electrically separated by an insulating coating 49, which may consist of an enamel or textile covering or other suitable material. The current is coupled from coil ends 46 and 48 to terminal studs 35 (FIG. 2).

With the present disclosure in view, modifications of the invention would appear to those skilled in the art. Accordingly, the invention is not limited to the exact detail of the illustrated embodiment, but includes all such modification and variation coming within the scope of the invention as defined in the appended claim.

What is claimed is:
1. A three-phase alternator comprising:
a rotatable magnetic field structure having two axially spaced magnet assemblies with each assembly having two North poles and two South poles alternately disposed thereon, in addition, the North poles on one assembly being disposed oppositely the South poles on the other assembly;
a stator consisting of two stator sections disposed between the magnet assemblies,
each stator section having three coils disposed side by side in a semicircle,
means on said sections for mounting and aligning said sections with respect to each other,
each coil consisting of two identical sections of spirally wound flat wire disposed back to back with the inner ends of the wire connected together and forming two terminals disposed on the outer ends of the coil.

References Cited
UNITED STATES PATENTS

| | | | |
|---|---|---|---|
| 573,080 | 12/1896 | Duncan | 324—134 |
| 2,880,335 | 3/1959 | Dexter | 310—268 |
| 3,320,454 | 5/1967 | Kober | 310—268 |
| 3,324,321 | 6/1967 | Kober | 310—268 X |
| 1,947,269 | 2/1934 | Leibing | 310—56 |

ORIS L. RADER, Primary Examiner

EZRA SUTTON, Assistant Examiner

U.S. Cl. X.R.

310—184, 259, 268